United States Patent [19]

Finkowski et al.

[11] Patent Number: 5,606,906
[45] Date of Patent: Mar. 4, 1997

[54] CONTROLLER FOR DOUGH LAPPER

[75] Inventors: James W. Finkowski, Andover; Robert F. Meyer, Maple Grove; James L. Schurz, Plymouth, all of Minn.

[73] Assignee: The Pillsbury Company, Minneapolis, Minn.

[21] Appl. No.: 590,271

[22] Filed: Nov. 21, 1995

[51] Int. Cl.[6] .................. A21C 3/06; A21C 9/04; A21C 11/00; A21D 6/00

[52] U.S. Cl. ............. 99/450.2; 99/353; 99/450.1; 425/92; 425/321; 425/325; 425/335

[58] Field of Search ............. 99/353, 450.1–450.8, 99/494; 414/783; 425/321, 322, 325, 329, 335, 391, 92, 115; 426/500–502, 512, 231; 198/456, 379, 468.3

[56] References Cited

U.S. PATENT DOCUMENTS

| | | | |
|---|---|---|---|
| 1,965,779 | 7/1934 | Mercier | 425/321 |
| 2,130,097 | 9/1938 | Loose | 425/320 |
| 2,478,075 | 8/1949 | Baker | 99/450.2 |
| 2,627,822 | 2/1953 | Hubbard | 425/396 |
| 3,013,298 | 12/1961 | Engel | 198/603 |
| 3,593,676 | 7/1971 | Reid et al. | 425/335 |
| 3,698,309 | 10/1972 | Steels | 99/450.1 |
| 3,804,637 | 4/1974 | Rejsa | 99/450.1 |
| 3,851,088 | 11/1974 | Albrecht | 99/450.1 |
| 4,196,527 | 4/1980 | Escande | 198/603 |
| 4,441,408 | 4/1984 | Costa | 99/450.2 |
| 4,622,890 | 11/1986 | Swanson . | |
| 4,656,908 | 4/1987 | Elwood | 99/450.2 |
| 4,741,263 | 5/1988 | Ueno et al. | 99/450.1 |
| 4,821,634 | 4/1989 | Swanson . | |
| 5,324,158 | 6/1994 | Shah et al. . | |

OTHER PUBLICATIONS

Brochure of Moline Machinery Ltd. entitled Processing Systems for the Food Industry; Sheeters, Laminators, Conveyers, etc. (undated).
Brochure of Sasib Bakery Holland entitled Rijkaart Laminator (undated).
Brochure of Doge Food Processing Machinery entitled Doge Laminating Line (undated).

*Primary Examiner*—Timothy F. Simone
*Attorney, Agent, or Firm*—Arnold, White & Durkee

[57] ABSTRACT

A dough web feeding device is provided which includes a first conveyor, a drive means or motor for that conveyor, a reciprocating shuttle, and a separate drive means or servo motor for the reciprocating shuttle. The speed, amount of rotation, and acceleration/deceleration profile for the drive means of the reciprocating shuttle can be precisely controlled to facilitate adjustable dough lapping.

13 Claims, 8 Drawing Sheets

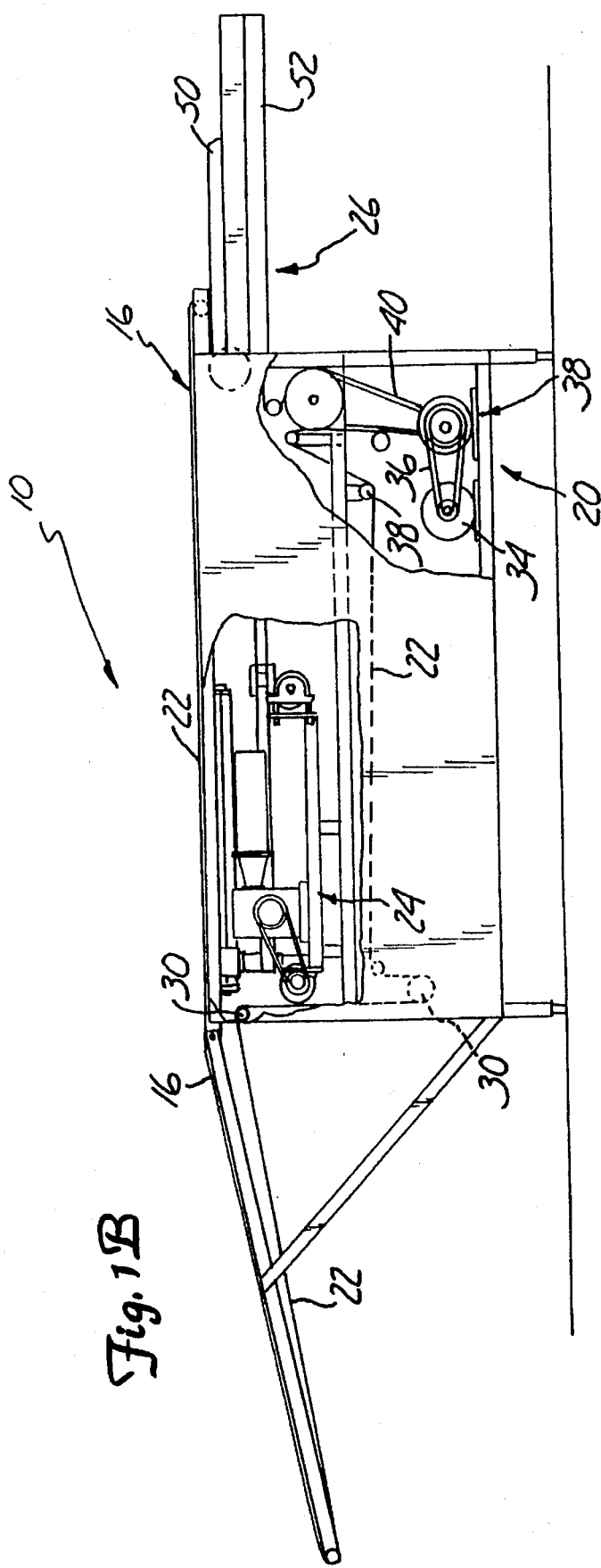

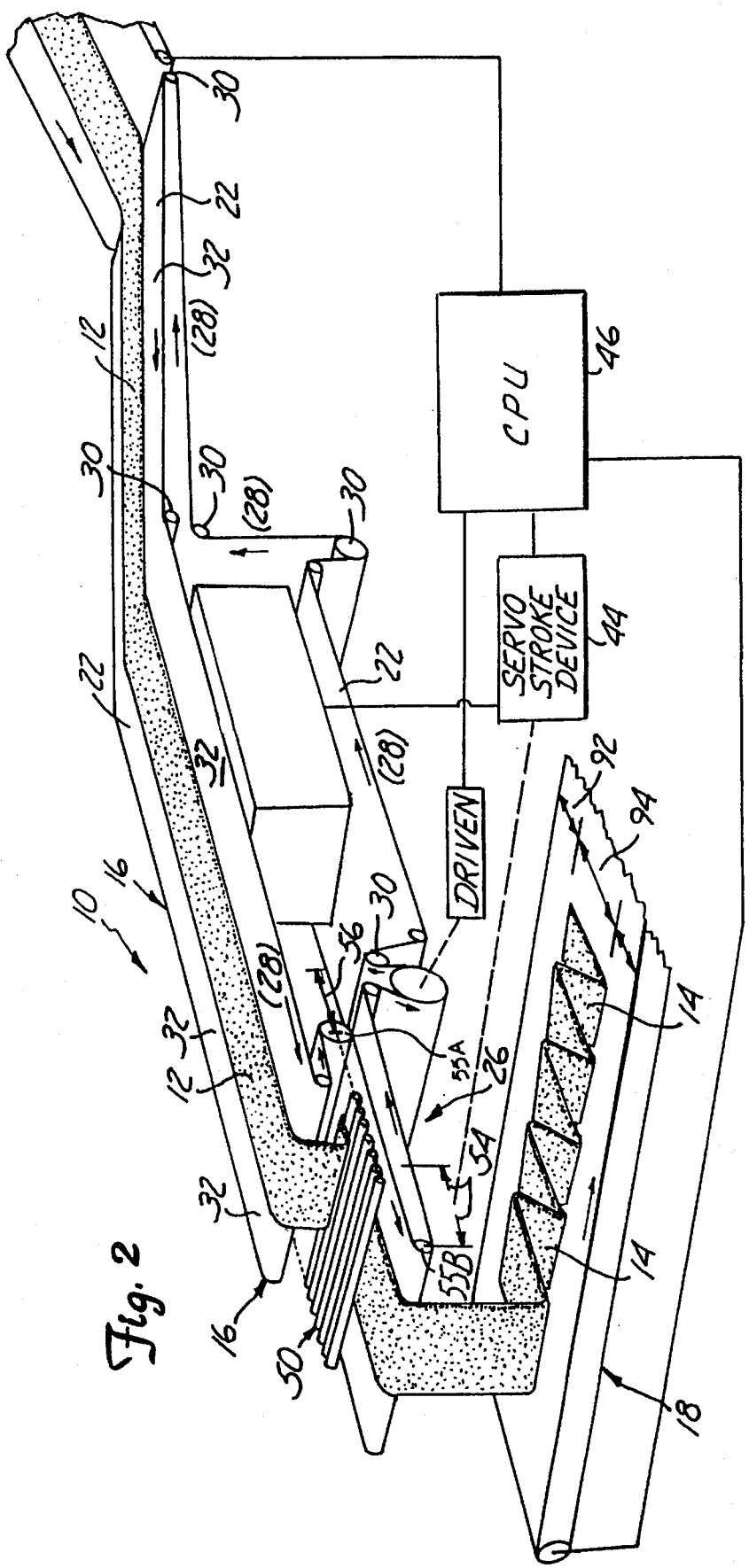

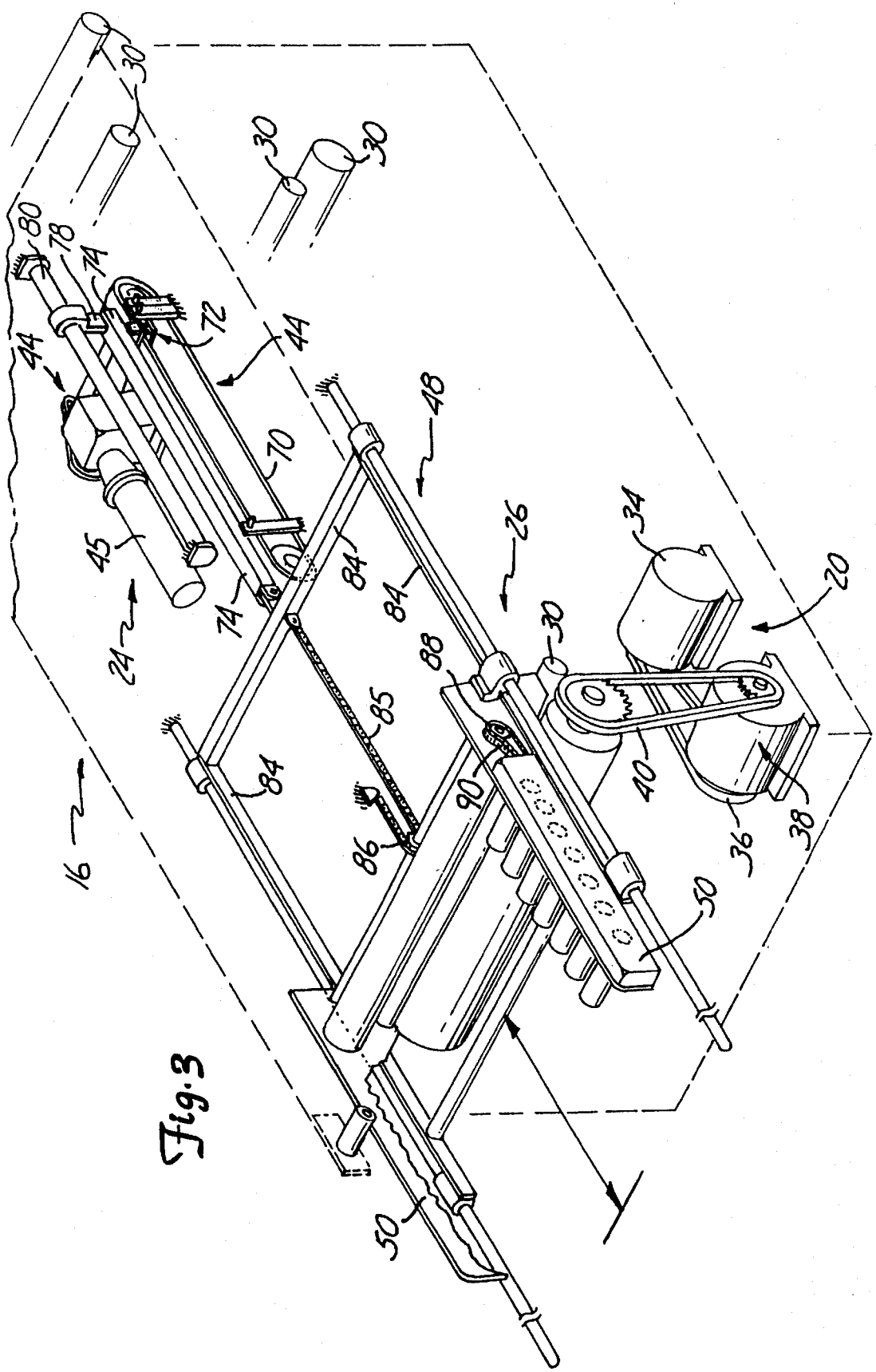

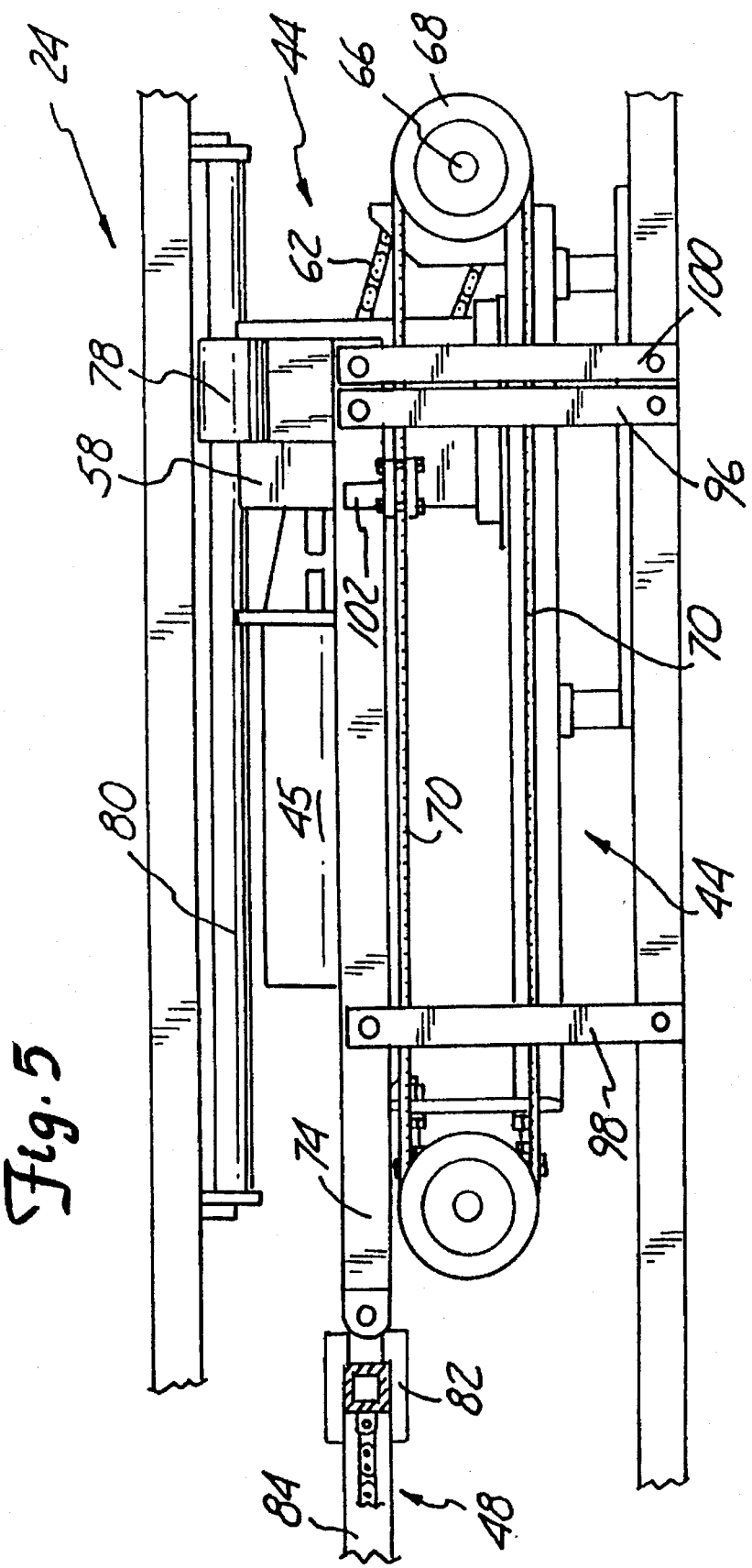

CONTROLLER FOR DOUGH LAPPER

BACKGROUND OF THE INVENTION

The present invention relates generally to a dough feeding system for use in preparing dough products by lamination and lapping. More specifically, the invention relates to an apparatus and method for flexibly and precisely controlling the lapping of a variety of laminated dough webs, including, for example, extremely thin and delicate pre-formed dough webs, to avoid unwanted bunching, stretching, tearing, or other problems. The substantial flexibility and precision of the dough lapping system is achieved through the use of an independent controller for the reciprocating conveyor portion of the dough lapper.

In the production of numerous different types of dough products, e.g., danish, croissants, biscuits, etc., it is desirable to provide laminated dough comprising a plurality of layers of alternating fat (e.g., vegetable oil or shortening) and dough. The precise number of layers of laminated dough and the thickness and other characteristics of the dough that are desired in a given instance vary depending on the particular product being made. Ideal lapped dough characteristics also vary according to how the layered dough is to be treated in subsequent stages of the manufacturing process for a given dough product. Because of variability in the desired lapping parameters, and because the particular dough and lapping requirements for any product have to be integrated within the operation of the entire dough feeding system (i.e., the "dough feeding line") when those parameters change, it is extremely advantageous to have apparatus for dough lapping, which is adjustable to allow relatively easy variation in dough lapping, but an apparatus which is nonetheless capable of precise control.

Conventional dough lapping or laminating machines utilize various electro-mechanical apparatus to effectuate the lapping of the dough. In general, however, prior dough lapping machines comprise two basic, essentially motor-driven conveyors positioned at 90 degrees relative to one another. A top conveyor, typically referred to as the "infeed conveyor," has a portion which reciprocates back and forth to deposit layers of dough on a second, lower-positioned conveyor, commonly referred to as the "outfeed" or "takeaway conveyor."

The conventional infeed conveyor typically comprises several parts, including primarily an infeed belt, which is supported by underlying support apparatus, for moving the dough forward, and a reciprocating shuttle, which reciprocates relative to the infeed belt causing the dough to be lapped onto the takeaway conveyor. In conventional systems, a single infeed conveyor drive means (i.e., motor and gearing apparatus) effects motion of both the infeed belt and the reciprocating shuttle of the infeed conveyor. The reciprocating shuffle may include one or more separate shuttle belts, which are also driven by the same single drive means. Alternatively the reciprocating shuttle itself may simply interact with the infeed belt to advance and reciprocate it. Since both the infeed conveyor belt and the reciprocating shuttle mechanism (with or without additional belts) are controlled by the same single drive means, any desired adjustment to the operation of either the infeed conveyor or the shuttle mechanism affects the operation of both the infeed conveyor and the shuttle in a conventional dough lapper. (In contrast, it is typical for the takeaway conveyor to have a different and independently-controlled drive means from that used to drive the infeed conveyor and its various sub-elements.)

Generally, the structure, speed and placement of the drive means, including the motor, gears, sprockets, shafts and belts, and other electro-mechanical components for the infeed belt and reciprocating shuttle of the conventional infeed conveyor determine, among other things, the speed, direction, and length of travel of the infeed conveyor. Also, construction and placement of the infeed conveyor determine the smoothness of travel of the infeed conveyor and the infeed conveyor's position relative to the takeaway conveyor at all points during dough lapping. Accordingly, for a conventional infeed conveyor, construction of the infeed conveyor's single drive means is important for determining the manner in which the infeed conveyor will operate to lap the fat-treated dough.

Because the electro-mechanical components of the conveyors of a conventional lapper essentially determine or fix the lapping characteristics of the lapper, it is often difficult or impossible to modify the lapping characteristics without altering or changing fundamental structures or electro-mechanical components within conventional lapping apparatus. This is true even in dough lappers that use variable transmission systems, which are operatively interposed between the infeed conveyor drive means and the reciprocating shuttle, to add variability in controlling the reciprocating shuttle. Specifically, such devices allow the shuttle's linear speed to be varied with respect to the belt speed, but with somewhat limited precision. Moreover, such apparatus still does not allow the length of travel of the shuffle, i.e., "stroke length" to be adjusted, the stroke length being fixed by a linear gear. To affect such a change, physical components must be changed.

With a single conveyor drive means, certain operational characteristics cannot be fine tuned, so more preferable independent optimization of the operation of both the belt and shuttle is not fully possible in conventional dough lappers; that is, the certain operating features of the infeed conveyor are only subject to more or less gross control. For example, the manner in which the reciprocating shuttle slows as it approaches the end of travel in a given direction and speeds up as it begins travel in a given direction (i.e., "acceleration/deceleration profile") is not subject to precise control in a conventional dough lapper with a single drive means. Although compensating means and indirect control means can be added to offset the limitations of using a single drive means, the single drive means still ultimately limits flexibility.

U.S. Pat. Nos. 4,622,890, and 4,821,634, originally assigned to the assignee of the present invention (now assigned to the Moline Co. of Duluth, Minn.) and naming as inventor Peter Swanson, describe dough lappers generally of the kind sought to be improved by the present invention. The '890 patent describes a dough lapper having an infeed conveyor and a takeaway conveyor, the belts of which travel perpendicular to each other. The '634 patent describes a dough laminator in which the infeed conveyor and the takeaway conveyor belts operate in parallel, i.e., "in line." Both patents show or discuss distinct drive means for the reciprocating and takeaway conveyors, but show and discuss a single drive means for controlling the operation of the belt and the shuttle system of the reciprocating conveyor, as is typical in conventional dough lapping systems.

The apparatus of the Swanson patents do achieve some limited control of the shuttle of the reciprocating conveyor as a result of the use of an air cylinder to effect reciprocation of two additional shuttle system belts. However, while the air cylinder permits some additional control, the air cylinder (like in a system with an interposed variable transmission system) is also in driving connection with the same single drive means for the infeed conveyor.

Accordingly, the present invention is directed to providing greater control and flexibility of dough lapping by independently controlling the infeed conveyor belt and the reciprocating shuttle. The present invention permits the conveyor belt and shuttle mechanism to be adjusted relative to one another and relative to the takeaway conveyor, either as independent elements or in combined operation.

The present invention further provide for electronic control of a drive means to control the movement of the reciprocating shuttle mechanism, permitting precise control and flexibility of dough lapping characteristics. The controller should be capable of precisely affecting control of the speed of shuttle reciprocation relative to the speed of the infeed belt, the position at which the dough will begin to be deposited on the takeaway conveyor, and the width of the dough as it is lapped onto the takeaway conveyor.

The shuttle controller should be capable of determining the precise relative position of the conveyor's shuttle, and be capable of controlling the speed and acceleration of the shuttle, including when travel direction is reversed. The shuttle controller should also be capable of providing over-travel protection to override any inappropriately wide shuttle movement that may be brought about by, for example, improper data input by a human operator.

SUMMARY OF THE INVENTION

Accordingly, the present invention provides a dough web feeding device for forming a dough web into a laminated dough web by lapping the dough web on itself. Specifically, the dough web feeding device comprises an infeed conveyor having a first conveying means with a top surface that includes a first discharge end and a belt that is movably mounted on the first conveying means. The first discharge end of the first conveying means is non-reciprocating relative to the ground during operation of the dough web feeding device.

The infeed conveyor of the dough web feeding device also includes a first drive means (i.e., motor and gearing apparatus with rollers) in combination with the first conveying means operable for effecting movement of the belt of the first conveying means at a first conveying speed in a first direction.

Additionally, the infeed conveyor includes a reciprocating means or shuttle mechanism positioned beneath the top surface of the conveying means. The reciprocating means includes a second discharge end. The second discharge end of the reciprocating means is movable relative to said first discharge end to move the belt of the conveyor means in reciprocating motion relative to the first discharge end. The infeed conveyor also comprises a second drive means in combination with the reciprocating means operable for effecting movement of the reciprocating means at a second reciprocating speed in the first direction and in a second direction opposite the first direction at a third reciprocating speed.

BRIEF DESCRIPTION OF THE DRAWINGS

FIGS. 1A and 1B are top plan and side elevational views of the dough lapper showing the conveyor belt, the reciprocating shuttle, the conveyor belt drive means, and the drive means for the reciprocating shuttle.

FIG. 2 is a diagrammatic view in perspective showing the dough lapper, including the infeed conveyor, dough paths and the reciprocating shuttle of the infeed conveyor.

FIG. 3 is a diagrammatic view in perspective showing the conveyor drive means and the servo stroke device comprising the reciprocating shuttle drive means.

FIG. 5 is a second side elevation of the servo stroke device and attached mechanisms.

DETAILED DESCRIPTION OF THE PREFERRED EMBODIMENT

Figure 1A:
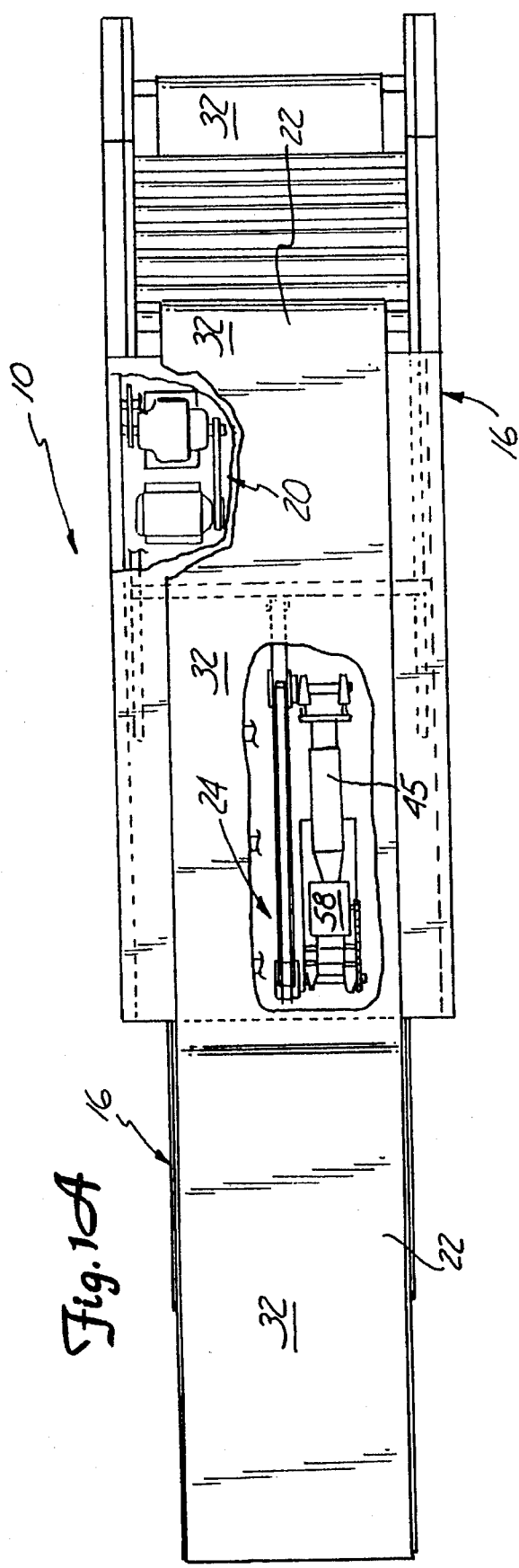

Referring to FIGS. 1A and 1B and 2, reference numeral 10 designates generally a dough lapping apparatus which is operable for taking a pre-formed web of dough 12 and laying web of dough 12 into a plurality of layers, one on top of the other, forming a laminated or lapped dough 14. Dough lapper 10 generally includes an infeed conveyor 16 and a takeaway conveyor 18. Lapped dough 14 is shown being deposited in lapped condition on takeaway conveyor 18 for removal to a subsequent processing stage/apparatus (not shown). In the present embodiment, infeed and takeaway conveyors 16 and 18 are shown being oriented perpendicular to each other. However, this orientation is merely illustrative and the conveyors may be oriented differently, including, for example, in parallel.

Three drive means are intended to be used with dough lapper 10. Takeaway conveyor 18 would be driven by its own drive means (not shown). Additionally, infeed conveyor 16 is driven by two separate drive means, a first drive means 20 for effecting operation of an infeed conveyor belt 22, and a second drive means 24 for effecting operation of reciprocating shuttle 26 of infeed conveyor 16.

Drive means 20 includes electro-mechanical apparatus of the kind generally known in the art for use in rotating infeed conveyor belt 22 completely through a path of rotation 28. Path of rotation 28 is formed by and supported, where appropriate, by a plurality of rollers 30. As formed, path of rotation 28 provides infeed conveyor belt 22 with a top surface 32 upon which web of dough 12 is carried forward toward reciprocating shuttle 26. Also, as explained in greater detail below, path of rotation 28 is operative to accommodate and vary with the movement of reciprocating shuttle 26. Reciprocating shuttle 26 is positioned below top surface 32 of infeed conveyor belt 22 such that, at a first discharge end of top surface 32 where web of dough 12 falls from top surface 32, dough web 12 is deposited on a portion of infeed conveyor belt 22 usually being kept in reciprocating motion relative to the first discharge end of top surface 32 by reciprocating shuttle 26. In the preferred embodiment, reciprocating shuttle 26 is in longitudinal alignment with infeed conveyor belt 22.

Specifically, drive means 20 includes a primary drive motor 34 (see also FIG. 3), which is in driving engagement with driving belt 36, idler pulley system 38, and driving belt 40 to effect movement of infeed conveyor belt 22 along path of rotation 28 in a well known manner. It should be observed that, while drive means 20 causes conveyor belt 22 to operate in a manner to cooperate with reciprocating shuttle 26 and allowing reciprocating shuttle 26 to actually contact and move infeed conveyor belt 22, drive means 20 does not itself effect movement of reciprocating shuttle 26.

Drive means 24 (including the microprocessor) effects movement of reciprocating shuttle 26 independent of drive means 20. That is, no mechanical linkage exists between separate drive means 20 and 24. Drive mean 24 comprises a servo stroke device 44, the operation of which is directly controlled by a microprocessor which is part of drive means 24. In a preferred embodiment, servo stroke device 44 is indirectly controlled by a central processing unit (CPU) 46, which is operable to control all the various portions and functions of dough lapper 10, including drive means 20. Alternatively, drive means 20 may have a separate controller, in which case, CPU 46 would track—without controlling—the operation of drive means 20. CPU 46 allows programming of various parameters (discussed below) to effect precise operation of drive means 24 through its microprocessor. In the preferred embodiment, CPU 46 includes an input device in the form of a keyboard (not shown), which a human operator uses to control parameters of operation for reciprocating shuttle 26.

Figure 6A:
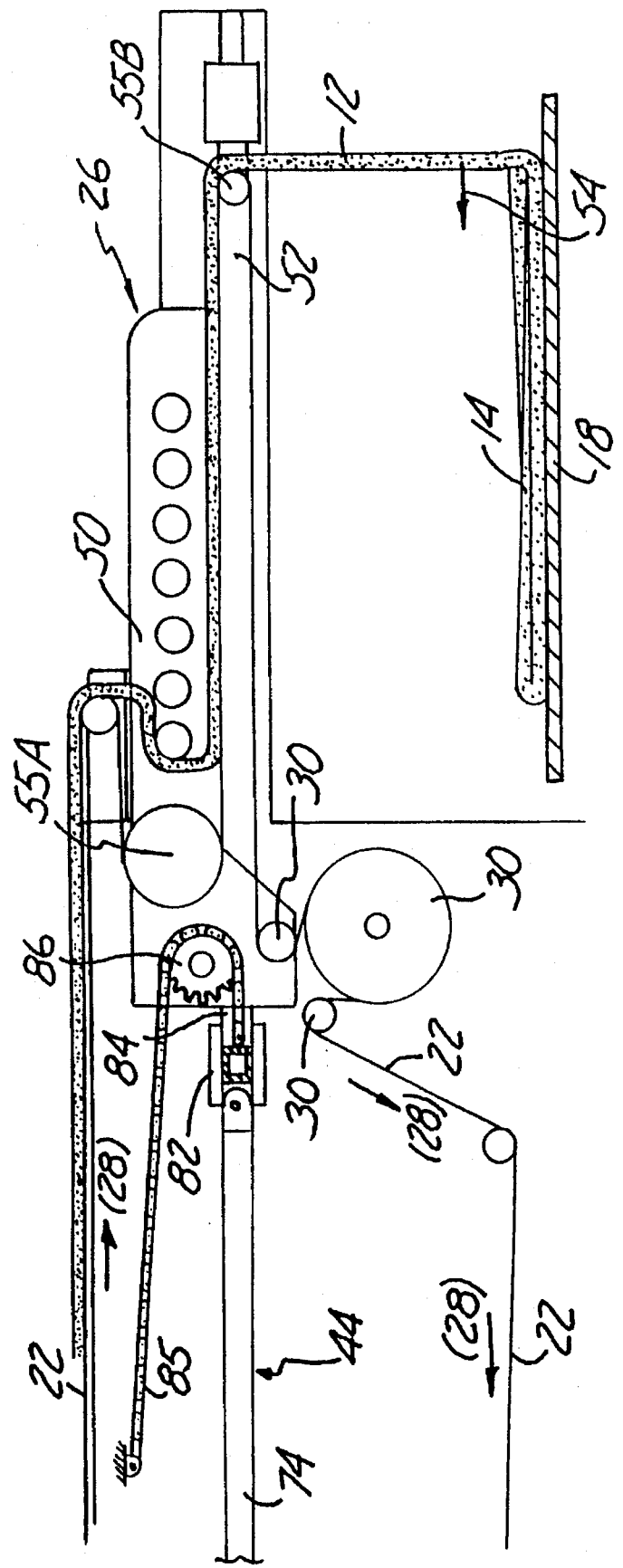
FIGS. 6A and 6B are side elevational views of the dough lapper at an extended and an intermediate position of travel of the reciprocating shuttle.
Figure 6B:
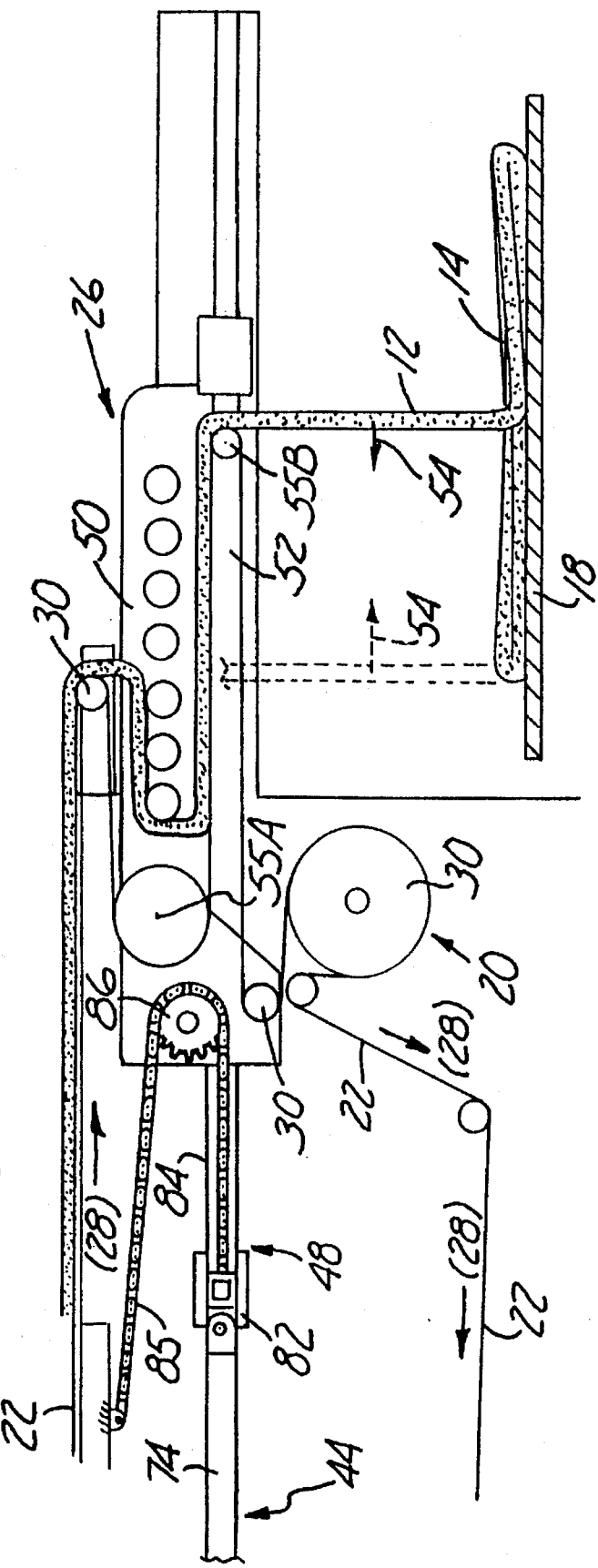

Servo stroke device 44 is in driving connection with servo linkage apparatus 48. Linkage apparatus 48 reciprocates in precise response to the movement of servo stroke device 44. In turn, servo linkage apparatus 48 is in driving connection with roller support means 50 and 52, each of which comprises one or more rollers for contacting and advancing conveyor belt 22 to accommodate the reciprocation of reciprocating shuttle 26 caused by precise rotational movement in opposite directions by servo stroke device 44. (See FIGS. 3, 6A and 6B.)

Roller support means 52 is positioned at an extreme second discharge end of conveyor belt 22 at which end web of dough 12 falls from infeed conveyor belt 22 onto takeaway conveyor 18. Because roller support means 52 is kept in reciprocating motion by servo stroke device 44 and servo linkage apparatus 48, dough web 12 is deposited in lapped fashion onto takeaway conveyor 18. It will be apparent that the precise manner of lapping is dependent on the speeds of the conveyors relative to each other and on the relative positions of the second discharge end and the takeaway conveyor. It will, therefore, also be apparent that the present invention makes the manner of lapping precisely controllable by servo stroke device 44, which is programmable by means of a microprocessor (not shown) to control the speed of movement and the length of travel of servo linkage apparatus 48 and, therefore, of roller support means 52. Although a servomotor-driven stroke device is described in the present embodiment, it is understood that any suitable drive means could be used to control shuttle mechanism 26.

More specifically, it will be observed that roller support means 52 has a range of motion 54 through which the second discharge end travels. The potential change in the length of path of rotation 28 caused by range of motion 54 of roller support means 52 must be offset in order to maintain conveyor belt 22 in tension and traveling at a suitable speed. To accomplish this, the present invention also utilizes servo linkage apparatus 48 to effect movement of roller support means 50. Roller support means 50 also has a range of motion 56 associated with it. Ranges of motion 54 and 56 are made complimentary to each other so that, as roller support means 52 moves outward, roller support means 50 moves outwardly at a sufficiently retarded speed to retain tension in conveyor belt 22. As roller support means 52 moves inward, roller support means 50 moves inwardly at a sufficiently increased speed to also prevent the presence of slack in conveyor belt 22. (See FIGS. 6A and 6B.)

To provide some further detail, it can be seen that servo linkage apparatus 48 advances and retracts to change the position of the second discharge end at the end of roller support means 52 to facilitate lapping, servo linkage apparatus 48 being mechanically connected to roller means 52 and to roller means 50. As roller support means 52 is moved outward, the total distance of travel for conveyor belt 22 remains unchanged because, at the same time, roller support means 50 is also moved outward. This results in complimentary changes in ranges of motion 54 and 56, affecting the length of travel of conveyor belt 22 toward and around rollers 55A and 55B of roller support means 50 and 52, respectively.

That is, as reciprocating shuttle 26 advances, the length of travel of conveyor belt 22 toward and over roller 55A decreases because the advance of roller support means 50 moves roller 55A closer to the first discharge end of conveyor belt 22. At the same time and in a corresponding amount to maintain tension in belt 22, the length of travel of conveyor belt 22 toward and over roller 55B increases because the advance of roller support means 52 moves roller 55B farther from the first discharge end of conveyor belt 22. The process is reversed when reciprocating shuttle 26 is retracted. During retraction, the length of travel of conveyor belt 22 toward and over roller 55A increases because the retraction of roller support means 50 moves roller 55A farther away from the first discharge end of conveyor belt 22. At the same time and, again, in corresponding amount, the length of travel of conveyor belt 22 toward and over roller 55B decreases because the retraction of roller support means 52 moves roller 55B closer to the first discharge end of conveyor belt 22.

Thus, it is apparent that the positions of roller means 50 and 52 relative to one another and to the first discharge end of top surface 32, will allow conveyor belt 22 to remain in rotation with the requisite amount of tension. Furthermore, it will be appreciated that the particular apparatus for accomplishing the above-described reciprocation should not be limited to the precise apparatus herein described with this preferred embodiment.

Figure 4:
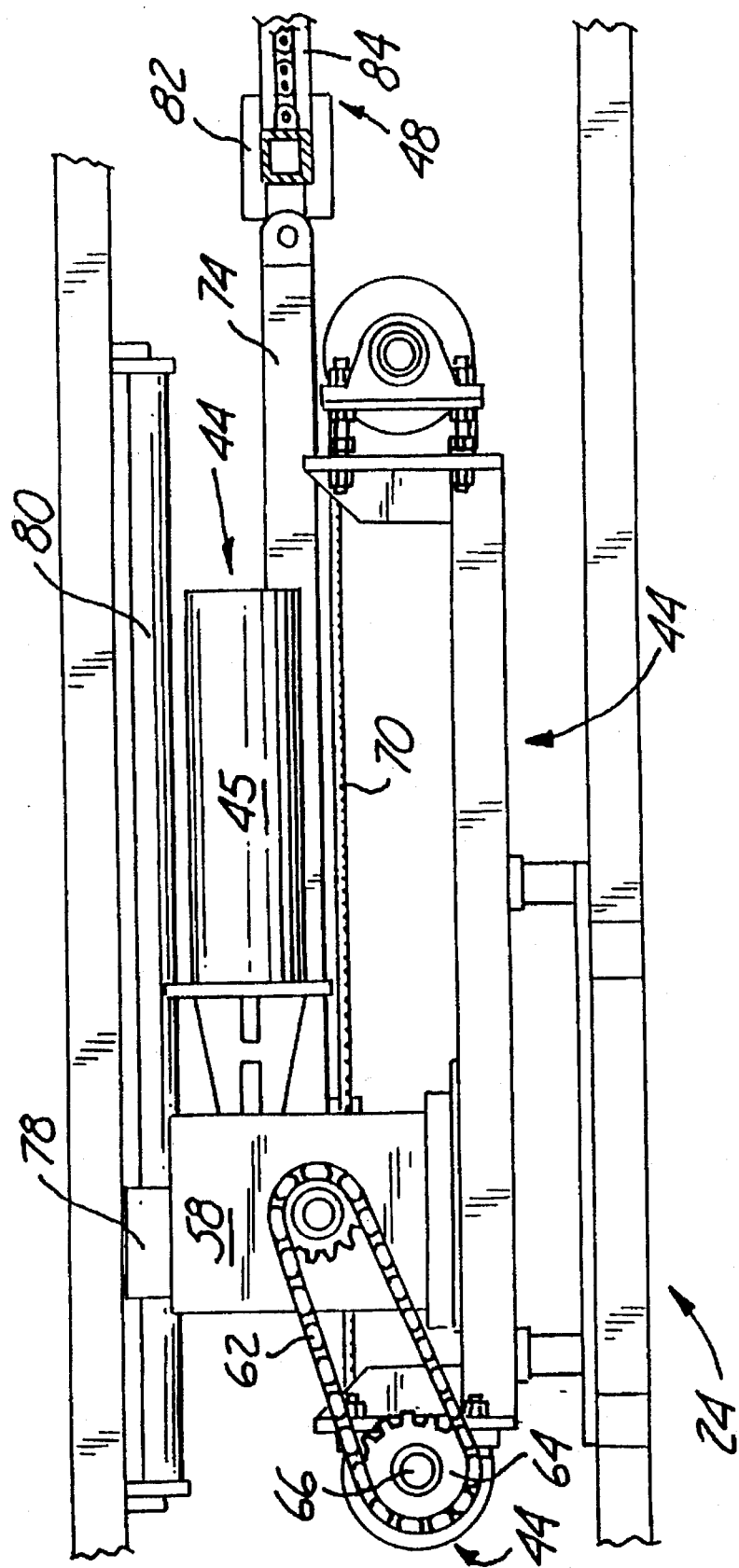
FIG. 4 is a first side elevation of the servo stroke device and attached mechanisms.

Referring to FIGS. 3–5, reciprocating shuttle 26, drive means 20 and 24, and servo linkage apparatus 48, are described here in greater detail. The servo stroke device or apparatus 44 comprises, among other things, a state of the art servomotor 45 having a resolver means for use in precisely determining the amount and speed of rotation of the servomotor. Information provided by the resolver is available to the microprocessor of servo stroke device 22 and to CPU 46 to control the servomotor.

Servo stroke device 44 is linked by a standard gearing apparatus 58 that re-orients the plane of rotation by 90 degrees. (In the preferred embodiment described here, re-orientation of the plane of rotation accomplishes a significant space savings in the overall housing for dough lapper 10.) A sprocket 60 of gearing apparatus 58 drives a chain 62 that turns a sprocket 64. Sprocket 64 is connected to a shaft 66 used to turn a roller 68 that turns a belt 70.

In the preferred embodiment, belt 70 is made to rotate in reciprocating motion by servo stroke device 44, but belt 70 has a limited, finely adjustable rotation of less than one-half rotation. This allows a clamping bracket 72, which is positioned on the top side of belt 70 to be retained on the top side of belt 70 and effect reciprocating motion of a reciprocating bar 74 which comprises part of the servo stroke device 44. Reciprocating bar 74 is supported from contacting the servo and gearing apparatus by a support connector 78 slidably connected to a support bar 80. Reciprocating bar 74 connects to roller support means 50 and 52 through a linkage bracket 82. Linkage bracket 82 connects to a servo linkage bar 84 that assists in driving roller support means 50 and 52 in cooperative movement, as described above. Specifically, servo linkage bar 84 pulls a chain 85 that turns sprocket 86 to move inward (toward the servo) roller support means 50 and 52, which are physically connected to operate in concert with each other. (See FIGS. 6A AND 6B.) Another sprocket 88 and chain 90 (see FIG. 3) operate to turn the rollers in roller support means 50 when conveyor belt 22 is moving.

Accordingly, it can be seen that the present invention is effective to precisely control the dough lapping process by controlling and driving operation of the reciprocating shuttle independent of the conveyor belt. Yet, because central electronic controls are employed that receive data and transmit control information to the drive means for the reciprocating shuttle, and that receive data from the conveyor belt drive means, the speed of reciprocating shuttle 26 of the present invention can be adjusted relative to the speed of conveyor belt 22 utilizing the centrally processed information. Specifically, the present invention allows a human operator to specify, electronically, a speed "ratio" (as between conveyor and shuttle) to set the speed of operation of reciprocating shuttle 26.

The present invention therefore permits greater control and flexibility in dough lapping, allowing independent control of the lapping characteristics, including the lap offset, the lap stroke and the lap width. The lap offset is the position 92 on takeaway conveyor 18 where the dough is first deposited on the takeaway conveyor. The lap stroke 94 is the total distance of travel of shuttle 26 from the offset position 92, which determines the lap width of the lapped dough 14. Because shuttle mechanism 26 is controlled independently of infeed conveyor belt 22, each of these lapping characteristics can be precisely adjusted without requiring significant changes to the overall system 10. Increased flexibility in selecting the lapping characteristics permits a wider variety of products to be made on the same lapper without requiring extensive line downtime and equipment retooling to make different products as with previous dough lapping apparatus.

Along the same lines, the present invention allows a human operator to specify an "offset" position 92 at which location on takeaway conveyor 18 dough will begin to be lapped. An operator can also specify how far reciprocating shuttle 26 will travel from the shuttle position corresponding to the offset to determine a "stroke" 94 or total width of travel and the width of lapped dough 14. (See FIG. 2.) In another embodiment, the shuttle mechanism 26 can be locked in a single non-reciprocating position while infeed conveyor 22 continues its path of rotation. This permits yet another degree of flexibility in that the dough lapping equipment can function simply as a conveyor without lapping the dough. Having the ability to control the shuttle 26 independently of the conveyor drive means 20 eliminates the need to remove the entire lapping apparatus 10 from the dough processing line if lapping is not desired for a particular product.

The present invention also permits precise control of servo stroke device 44 such that its speed and acceleration/deceleration profile can be finely controlled throughout its rotational movement. This permits the movement of reciprocating shuttle 26 to be adjusted to avoid stretching of thin dough webs, or to put extra tension across a dough web when this is desired.

Referring to FIG. 5, a further feature of the present invention is described. The present invention incorporates overtravel protection to prevent excessive movement of reciprocating shuttle 26. In the preferred embodiment, the invention includes travel sensors 96, 98 and 100. These sensors work in conjunction with a position element 102 (attached to clamping bracket 72), and the microprocessor of reciprocating conveyor 164.0 determine when the amount of rotation of belt 70 is too great. This might be caused, for example, if a human operator specifies and inordinately small (negative) offset or an excessive (positive) stroke.

Clamping bracket 72 and position element 102 normally should travel only between sensor element 96, which is positioned to correspond to a zero offset for reciprocating conveyor 16, and a location interior to sensor element 98, the position of which corresponds to just slightly more than the maximum allowable stroke for lapped dough 14. Accordingly, if position element 102 comes to be detected by either of position sensors 96, 98 or 100, it will be known that maximum (or more than maximum) travel has taken place; any necessary corrective action will then be carried out. Excessive movement in the direction of position sensor 94 is known as "positive" overtravel; excessive movement in the direction of position sensor 96 is known as "negative" overtravel.

While the foregoing description seeks to fully capture the present invention, it should be understood that the form of this invention is not intended to be limited by the preferred embodiment, as herein illustrated and described.

What is claimed is:

1. A dough web feeding device for forming a dough web into a laminated dough web by lapping the dough web on itself, the device comprising:

a. a first conveying means including a top surface with a first discharge end and a first belt movably mounted on said first conveying means, said first discharge end being non-reciprocating relative to the ground during operation of the dough web feeding device;

b. first drive means operably associated with said first conveying means operable for effecting movement of said first belt of said first conveying means at a first conveying speed in a first direction;

c. reciprocating means, positioned beneath said top surface of said first conveying means, and including a second discharge end, said second discharge end being means being movable relative to said first discharge end to move said first belt in reciprocating motion relative to said first discharge end; and d. second drive means operably associated with said reciprocating means operable for effecting movement of said reciprocating means at a second reciprocating speed in the first direction and in a second opposite direction at a third reciprocating speed.

2. A dough web feeding device as set forth in claim 1 further comprising:

a second conveying means having a second belt positioned beneath said reciprocating means and operable to receive a dough web from said reciprocating means, said reciprocating means and said second conveying means being operable cooperatively to provide a lapped dough web on said second belt.

3. A dough web feeding device as set forth in claim 2 wherein:

said first conveying means and said reciprocating means are in superposed relationship and are generally in longitudinal alignment.

4. A dough web feeding device as set forth in claim 3 wherein:

said second drive means is controllable to effect movement of said reciprocating means at said second speed, said second speed having a ratio to said first speed to effect lapping of said dough web onto said second conveying means.

5. A dough web feeding device as set forth in claim 3, said reciprocating means further comprising:

a. a first roller support means connected to said second discharge end for moving said second discharge end; and b. a second roller support means positioned above said first roller support means, said first and second roller support means contacting said first belt and being movable relative to each other to reciprocate said first belt to maintain tension in said first belt as said first belt is conveyed by said first conveying means.

6. A dough web feeding device as set forth in claim 5, said reciprocating means further comprising:

linkage means connected between said second drive means and said first and second roller support means operable to cooperatively move said first and second roller support means relative to each other.

7. A dough web feeding device as set forth in claim 6, said second drive means comprising:

a servomotor operable for effecting movement of said reciprocating means in said first and second directions at said second and third reciprocating speeds.

8. A dough web feeding device as set forth in claim 7, wherein:

said second drive means comprises a first microprocessor and wherein said servomotor is electronically controlled by said microprocessor which is operably programmed to effect movement of said servomotor and said reciprocating means and programmable to selectively effect the movement of said reciprocating means in said first and second directions at predetermined second and third reciprocating speeds.

9. A dough web feeding device as set forth in claim 8, said first drive means comprising:

a second microprocessor operable to electronically control said first drive means to effect movement of said first drive means in said first direction at said first speed, said second drive means being operable to effect the movement of said reciprocating means at second and third reciprocating speeds in relation to said first speed.

10. A dough web feeding device as set forth in claim 9, said second drive means further comprising:

relative position determining means for providing said microprocessor with relative position information for use in controlling movement of said servomotor and said reciprocating means relative to a known position of said servomotor corresponding to a known position of said second discharge end.

11. A dough web feeding device as set forth in claim 10, said dough web feeding device further comprising:

means for inputting control information to control movement of said servo motor and, therefore, of said reciprocating means.

12. A dough web feeding device as set forth in claim 11, wherein:

said means for inputting control information is operative to receive and provide to said microprocessor predetermined control parameters for determining said second and third reciprocating speeds in relation to said first conveying speed and a length of travel of said reciprocating means in said first direction and said second opposite direction.

13. A dough web feeding device as set forth in claim 12, wherein:

said second drive control means is operative to determine travel of said reciprocating shuttle beyond predetermined travel distances in said first direction and in said second opposite direction, and to determine whether to halt travel when said shuttle has travelled beyond said predetermined travel distances.

* * * * *